(12) United States Patent
Kimura et al.

(10) Patent No.: US 7,862,474 B2
(45) Date of Patent: Jan. 4, 2011

(54) SPEED CHANGE CONTROL DEVICE FOR AUTOMATIC TRANSMISSION AND CONTROL METHOD THEREOF

(75) Inventors: Yusuke Kimura, Yokohama (JP); Atsufumi Kobayashi, Yamato (JP); Tatsuo Ochiai, Chigasaki (JP); Shuichi Wakabayashi, Yokohama (JP); Akihiro Makiyama, Yokohama (JP); Ryoji Kadono, Isehara (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 725 days.

(21) Appl. No.: 11/727,706

(22) Filed: Mar. 28, 2007

(65) Prior Publication Data

US 2007/0232443 A1 Oct. 4, 2007

(30) Foreign Application Priority Data

Mar. 29, 2006 (JP) .............................. 2006-090318

(51) Int. Cl.
*F16H 61/16* (2006.01)
(52) U.S. Cl. ....................................... 477/125; 477/141
(58) Field of Classification Search ........................ None
See application file for complete search history.

(56) References Cited

U.S. PATENT DOCUMENTS

| 5,882,277 | A | 3/1999 | Iizuka |
| 6,085,139 | A | 7/2000 | Nakauchi et al. |
| 6,175,797 | B1 | 1/2001 | Iizuka |
| 6,409,628 | B1 * | 6/2002 | Kuras ........................... 477/69 |
| 6,514,174 | B2 * | 2/2003 | Iida et al. ...................... 477/125 |
| 6,679,134 | B2 * | 1/2004 | Shigyo ...................... 74/336 R |
| 6,837,505 | B2 | 1/2005 | Fujii |
| 6,878,095 | B2 * | 4/2005 | Shigyo .......................... 477/86 |
| 7,052,436 | B2 * | 5/2006 | Dobele .......................... 477/141 |
| 7,179,196 | B2 * | 2/2007 | Oshita et al. ................... 477/46 |
| 2003/0071436 | A1 | 4/2003 | Fujii |
| 2004/0248697 | A1 | 12/2004 | Dobele |

FOREIGN PATENT DOCUMENTS

| DE | 197 40 647 A1 | 3/1998 |
| DE | 197 40 648 A1 | 3/1998 |
| DE | 101 51 909 A1 | 4/2003 |
| EP | 1070880 A1 * | 1/2001 |
| JP | 06-76762 U | 10/1994 |
| JP | 09-217824 A | 8/1997 |
| JP | 09-264415 A | 10/1997 |
| JP | 10-141485 A | 5/1998 |
| JP | 2003-120799 A | 4/2003 |

\* cited by examiner

*Primary Examiner*—David D Le
*Assistant Examiner*—Justin Holmes
(74) *Attorney, Agent, or Firm*—Foley & Lardner LLP

(57) ABSTRACT

A speed change control device for an automatic transmission according to this invention determines whether or not a request to downshift a gear position of the transmission exists during traveling in a manual speed change mode (S1, S2), and calculates an input shaft rotation speed of the transmission following a downshift based on the downshift request (S4). When it is determined that the calculated rotation speed is higher than a rotation speed limit value (S5), the speed change control device performs a downshift to a gear position at which the input shaft rotation speed of the transmission is lower than the calculated rotation speed (S6, S8).

17 Claims, 5 Drawing Sheets

SPEED CHANGE CONTROL DEVICE FOR AUTOMATIC TRANSMISSION AND CONTROL METHOD THEREOF

FIELD OF THE INVENTION

This invention relates to the speed change control of a speed change control device for an automatic transmission, and more particularly speed change control performed in a manual mode.

BACKGROUND OF THE INVENTION

JP10-141485A published by the Japan Patent Office describes a vehicle installed with an automatic transmission comprising a manual mode in which the gear position can be selected freely in accordance with the intent of a driver. According to another known technique for improving drivability, the gear position is upshifted (an auto upshift is performed) in accordance with the engine rotation speed and so on even when the driver is currently selecting a certain gear position in the manual mode, and thus an increase in engine rotation speed is prevented until fuel is cut in order to protect the engine and transmission.

SUMMARY OF THE INVENTION

In the prior art described above, when a downshift is performed to the vicinity of running conditions at which an auto upshift is performed, the auto upshift is performed immediately thereafter, and the resulting shift busyness makes the driver feel uncomfortable.

An object of this invention is to suppress the sense of discomfort felt by a driver as a result of shift busyness while maintaining the auto upshift function of the gear position.

In order to achieve the object, this invention provides a speed change control device for an automatic transmission, including a manual speed change mode in which switching between a plurality of gear positions can be performed in accordance with a driver operation. The device comprising a controller which upshifts a gear position when a rotation speed of an input shaft of the transmission exceeds a predetermined high rotation speed, determines whether or not a request to downshift the gear position of the transmission exists during traveling in the manual speed change mode, calculates the input shaft rotation speed of the transmission following a downshift based on the downshift request, determines whether or not the calculated rotation speed is higher than a rotation speed limit value set on a lower rotation side than the predetermined high rotation speed, and performs a downshift to a gear position at which the input shaft rotation speed of the transmission is lower than the calculated rotation speed when it is determined that the calculated rotation speed is higher than the rotation speed limit value.

According to this invention, when it is determined that the input shaft rotation speed of the transmission following a downshift is greater than the rotation speed limit value, a downshift is performed to a gear position at which the input shaft rotation speed of the transmission falls below the post-downshift rotation speed, and thus a situation in which the input shaft rotation speed of the transmission reaches an auto upshift rotation speed such that an upshift is performed immediately after the downshift can be prevented. As a result, the sense of discomfort felt by a driver due rapid changes in the gear position can be prevented.

DESCRIPTION OF THE PREFERRED EMBODIMENTS

Embodiments of this invention will be described in detail below with reference to the drawings and so on.

First Embodiment

Figure 1:
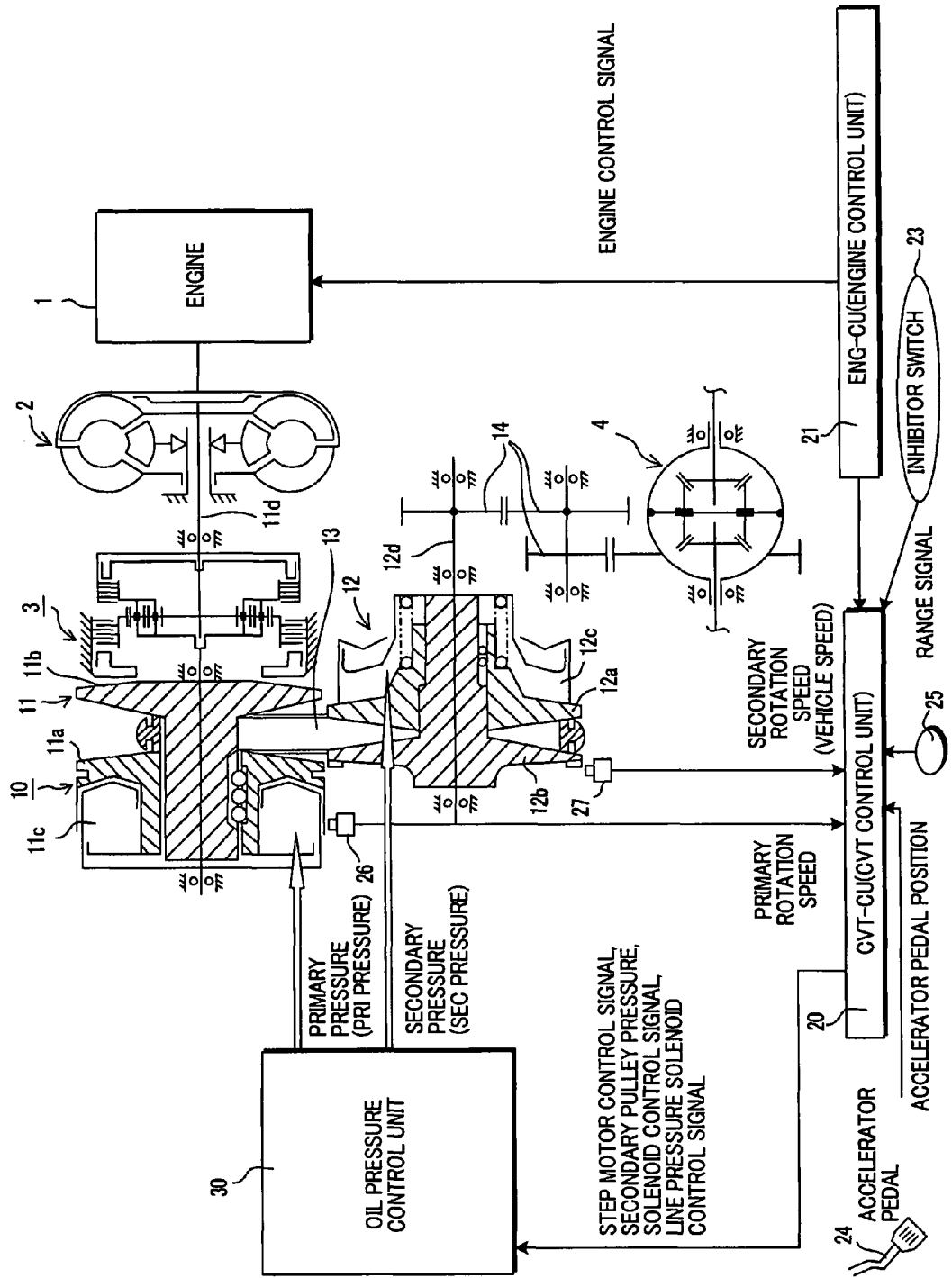
FIG. 1 is a schematic diagram showing a speed change control device for an automatic transmission according to a first embodiment.

FIG. 1 is a schematic diagram showing a speed change control device for an automatic transmission according to an embodiment. A belt type continuously variable transmission 10 comprises a primary pulley 11, a secondary pulley 12, a V belt 13, a CVT control unit 20 (CVTCU hereafter), and an oil pressure control unit 30.

The primary pulley 11 is an input shaft side pulley which inputs the rotation of an engine 1 into the belt type continuously variable transmission 10. The primary pulley 11 comprises a fixed conical plate 11b which rotates integrally with an input shaft 11d, and a movable conical plate 11a which is disposed opposite the fixed conical plate 11b to form a V-shaped pulley groove, and which can be displaced axially by oil pressure acting on a primary pulley cylinder chamber 11c. The primary pulley 11 is connected to the engine 1 via a forward-reverse switching mechanism 3 and a torque converter 2 comprising a lockup clutch, and inputs the rotation of the engine 1. The rotation speed of the primary pulley 11 is detected by a primary pulley rotation speed sensor 26.

The belt 13 is wrapped around the primary pulley 11 and secondary pulley 12 such that the rotation of the primary pulley 11 is transmitted to the secondary pulley 12.

The secondary pulley 12 outputs the rotation transmitted by the belt 13 to a differential 4. The secondary pulley 12 comprises a fixed conical plate 12b which rotates integrally with an output shaft 12d, and a movable conical plate 12a which is disposed opposite the fixed conical plate 12b to form a V-shaped pulley groove, and which can be displaced axially in accordance with oil pressure acting on a secondary pulley cylinder chamber 12c. It should be noted that the pressure-receiving surface area of the secondary pulley cylinder chamber 12c is set substantially equally to the pressure-receiving surface area of the primary pulley cylinder chamber 11c.

The secondary pulley 12 is connected to the differential 4 via an idler gear 14 and an idler shaft, and outputs rotation to the differential 4. The rotation speed of the secondary pulley 12 is detected by a secondary pulley rotation speed sensor 27. The vehicle speed may be calculated from the rotation speed of the secondary pulley 12.

The CVTCU 20 determines the speed ratio (a value obtained by dividing the effective radius of the secondary pulley 12 by the effective radius of the primary pulley 11) and a contact frictional force on the basis of signals from an inhibitor switch 23, an accelerator pedal position sensor 24, an oil temperature sensor 25, the primary pulley rotation speed sensor 26, the secondary pulley rotation speed sensor 27, and so on, as well as input torque information from an engine control unit 21, by referring to a speed change line prepared in advance, and controls the belt type continuously variable transmission 10 by transmitting commands to the oil pressure control unit 30.

The oil pressure control unit 30 operates on the basis of the commands from the CVTCU 20. The oil pressure control unit 30 causes the movable conical plate 11a and the movable conical plate 12a to reciprocate in a rotary axis direction by supplying oil pressure to the primary pulley 11 and secondary pulley 12.

When the movable conical plate 11a and the movable conical plate 12a move, the pulley groove width varies, and as a result, the belt 13 moves over the primary pulley 11 and secondary pulley 12. Thus, the contact radius between the belt 13 and the primary pulley 11 and secondary pulley 12 varies, whereby the speed ratio and the contact frictional force of the belt 13 are controlled.

The rotation of the engine 1 is input into the belt type continuously variable transmission 10 via the torque converter 2 and the forward-reverse switching mechanism 3, and transmitted from the primary pulley 11 to the differential 4 via the belt 13 and secondary pulley 12.

When the accelerator pedal is depressed or a shift change is performed in a manual mode, the movable conical plate 11a of the primary pulley 11 and the movable conical plate 12a of the secondary pulley 12 are axially displaced, thereby varying the contact radius thereof with the belt 13 such that the speed ratio is varied continuously.

The speed ratio is set on the basis of a map on which a plurality of speed change lines indicating the relationship between the vehicle speed and the primary rotation speed are prepared for each throttle opening, by looking up a primary rotation speed that corresponds to the vehicle speed and the throttle opening.

Figure 2:
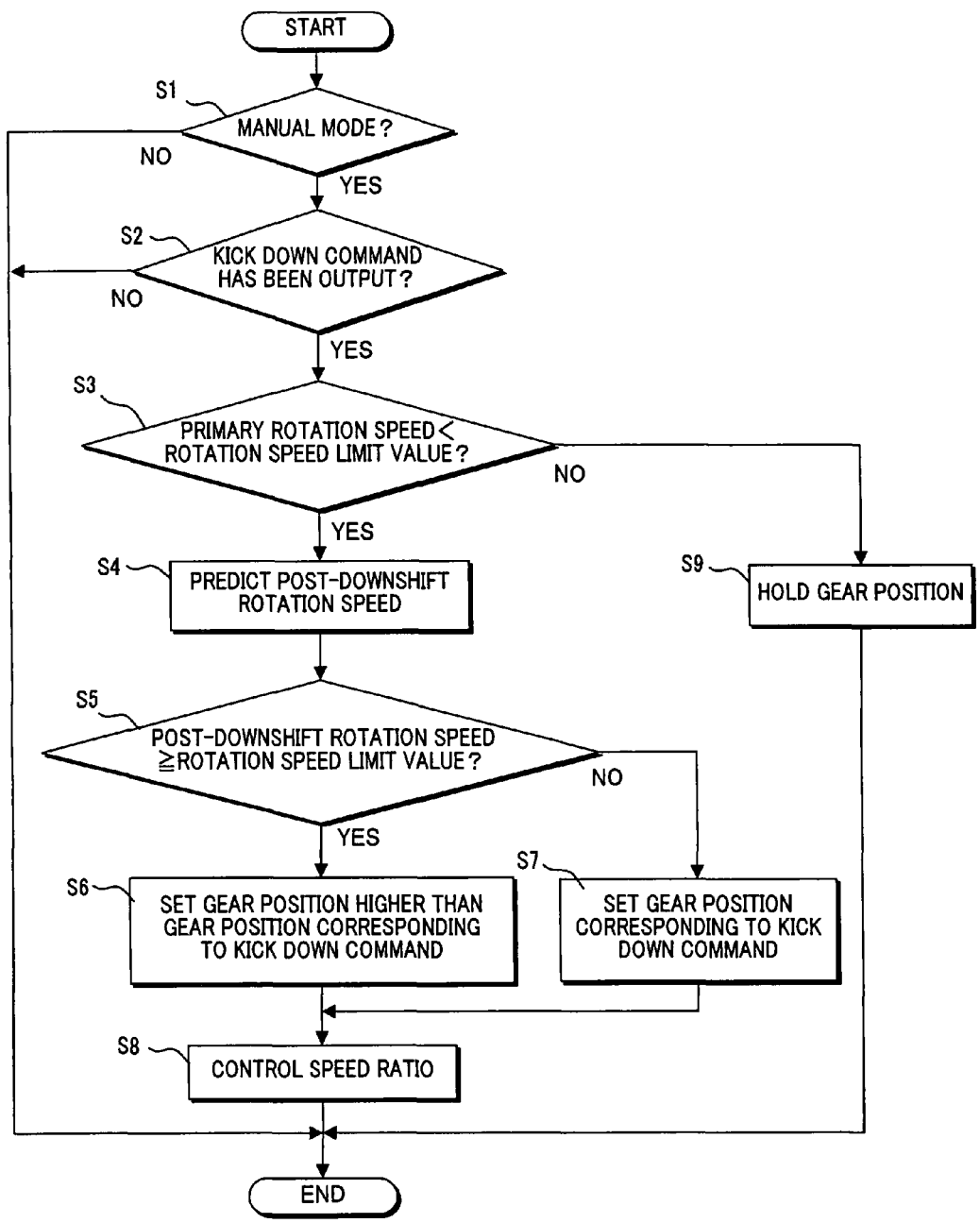
FIG. 2 is a flowchart showing control of the speed change control device for an automatic transmission according to the first embodiment.

The control performed by the CVTCU 20 will now be described with reference to the flowchart in FIG. 2. FIG. 2 is a flowchart illustrating the control of the speed change control device for an automatic transmission according to this embodiment. This control is performed repeatedly at brief intervals (of 10 ms, for example).

In a step S1, a determination is made as to whether or not a speed change mode is set to a manual mode. When it is determined that the manual mode has been set, the routine advances to a step S2, and when it is determined that the manual mode has not been set, the processing is terminated. Here, the manual mode is a speed change mode in which a shift schedule corresponding to a plurality of gear positions is prepared in advance such that a driver can perform an operation to switch between each gear position.

In the step S2 (downshift request determining means), a determination is made as to whether or not a kick down command has been output. When it is determined that a kick down command has been output, the routine advances to a step S3, and when it is determined that a kick down command has not been output, the processing is terminated. A kick down is a downshift for improving the acceleration performance, and a kick down command may be output on the basis of the vehicle speed and accelerator pedal position, or a kick down switch may be provided such that a kick down command is output when the driver operates the kick down switch.

In the step S3, a determination is made as to whether or not the primary rotation speed is lower than a rotation speed limit value (first rotation speed limit value). When it is determined that the primary rotation speed is lower than the rotation speed limit value, the routine advances to a step S4, and when it is determined that the primary rotation speed is equal to or higher than the rotation speed limit value, the routine advances to a step S9.

Here, an excessively high primary rotation speed causes problems in terms of the durability of the engine 1 and transmission 10, and therefore when the primary rotation speed reaches a predetermined rotation speed, a fuel cut is implemented to protect the engine 1 and transmission 10. However, when a fuel cut is implemented, the driving force of the engine falls rapidly and the drivability deteriorates. To prevent this, an auto upshift rotation speed (predetermined high rotation speed) is set as a threshold for forcibly shifting the gear position to the up side (auto upshift means) before the primary rotation speed reaches a fuel cut rotation speed.

The rotation speed limit value employed in this step is set to a rotation speed at which the time required for the primary rotation speed to reach the auto upshift rotation speed after exceeding the rotation speed limit value during acceleration is equal to or greater than a predetermined time. The predetermined time (first predetermined time) is set to a time which is long enough to ensure that the driver does not feel a sense of discomfort at the interval between a downshift and the auto upshift, and is set in advance through experiment or the like.

Furthermore, when the vehicle speed is comparatively low and a speed change is performed at a high primary rotation speed, a driving force step is likely to occur, and therefore the rotation speed limit value is set such that acceleration produced by a driving force step occurring during a kick down is smaller than a predetermined acceleration upper limit value. The predetermined acceleration upper limit value is set in advance through experiment or the like to a value at which the driving force step does not cause the driver to feel a sense of discomfort.

In the step S4 (rotation speed determining means), a post-downshift engine rotation speed is predicted. During execution of this step, a kick down command has been output, and therefore the primary rotation speed at the speed ratio following the kick down is predicted by referring to a speed change diagram such as that shown in FIG. 3, for example.

In a step S5 (rotation speed determining means), a determination is made as to whether or not the post-downshift primary rotation speed predicted in the step S4 is equal to or greater than the rotation speed limit value. When the post-downshift primary rotation speed is equal to or greater than the rotation speed limit value, the routine advances to a step S6, and when the post-downshift primary rotation speed is smaller than the rotation speed limit value, the routine advances to a step S7.

In the step S6 (downshift control means), the lowest gear position among the gear positions at which the primary rotation speed falls below the rotation speed limit value, rather than the gear position indicated by the kick down command, is set as a target gear position. As a result, a gear position higher than the gear position corresponding to the kick down command is set as the target gear position.

In the step S7, on the other hand, the gear position indicated by the kick down command is set as the target gear position.

In a step S8, the speed ratio of the transmission 10 is controlled on the basis of the gear position set in the step S6 or the step S7.

Meanwhile, when it is determined in the step S3 that the primary rotation speed is equal to or higher than the rotation speed limit value, the routine advances to the step S9, where the gear position is held.

Figure 3:
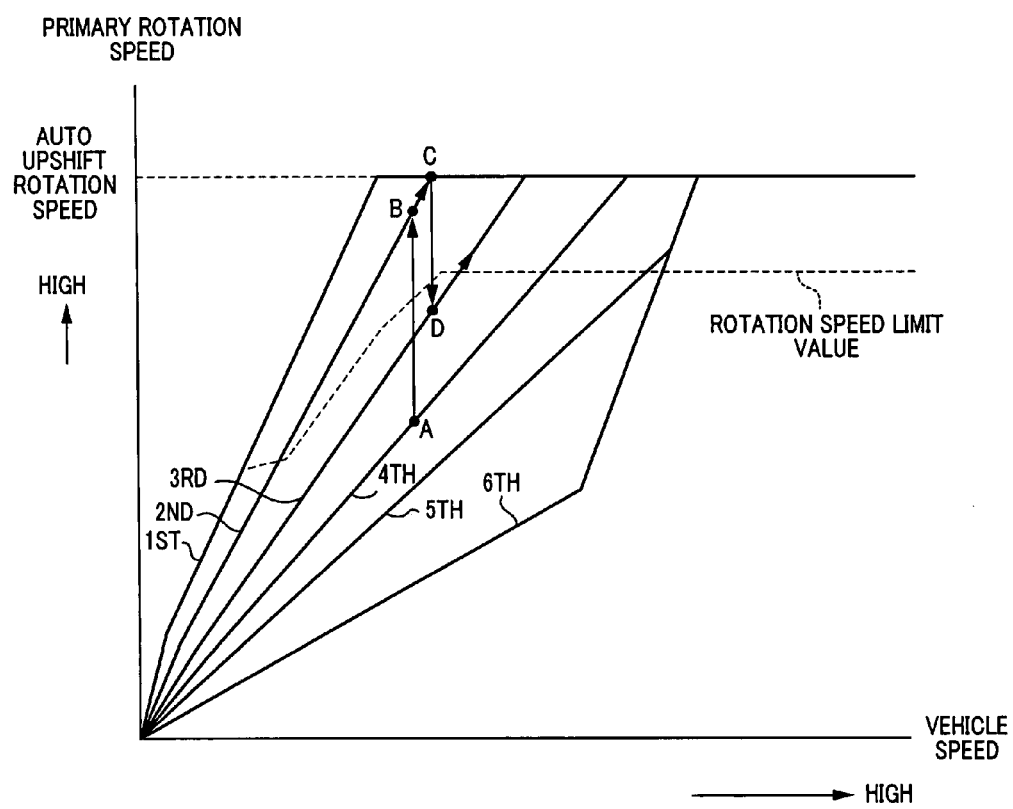
FIG. 3 is a map showing the relationship between a vehicle speed, a primary rotation speed, and a speed ratio.
Figure 4:
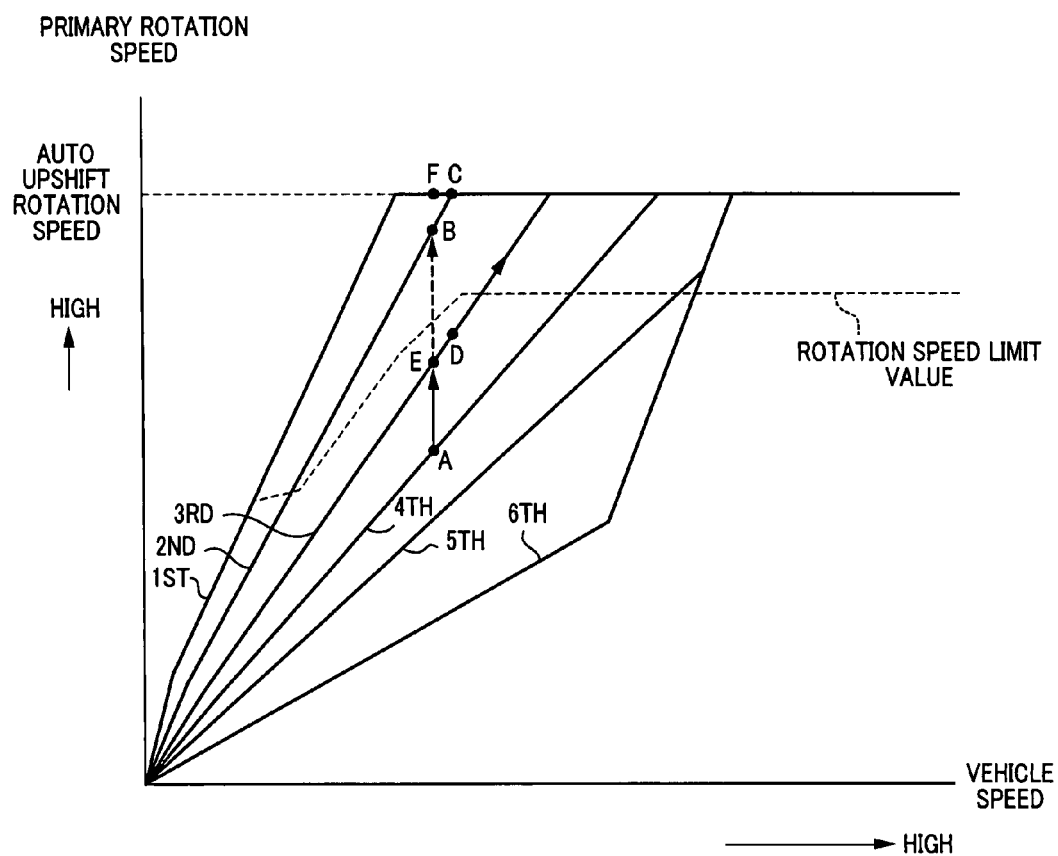
FIG. 4 is a map showing the relationship between a vehicle speed, a primary rotation speed, and a speed ratio.

Next, referring to the maps in FIGS. 3 and 4, the actions of this embodiment will be described. FIGS. 3 and 4 are maps showing a shift schedule of the respective gear positions. FIG. 3 shows the prior art, while FIG. 4 shows this embodiment.

First, the prior art will be described with reference to FIG. 3. In the manual mode, when a kick down command instructing a kick down to a second speed is output at a driving point A during acceleration in a fourth speed, a downshift is performed to the second speed such that the driving point shifts to a driving point B. When acceleration continues thereafter such that the auto upshift rotation speed is reached at a driving point C, an upshift is performed to a third speed such that the driving point shifts to a driving point D. Thus in the prior art, an upshift is performed immediately after a downshift, and as a result the drivability deteriorates.

Next, this embodiment will be described with reference to FIG. 4. In the manual mode, when a kick down command instructing a kick down to the second speed is output at the driving point A during traveling in the fourth speed, the predicted post-downshift primary rotation speed at the driving point B is equal to or greater than the rotation speed limit value. Therefore, a downshift is performed to a third speed, which is the lowest gear position among the gear positions at which the primary rotation speed falls below the rotation speed limit value, and the driving point shifts to a driving point E. Thus, a situation in which an upshift is performed immediately after a downshift can be avoided.

Further, when a kick down command is output during acceleration at the driving point B, the primary rotation speed is equal to or greater than the rotation speed limit value, and therefore the gear position is not switched and the current gear position is held.

In the embodiment described above, when it is determined that the predicted primary rotation speed following a downshift is greater than the rotation speed limit value, a downshift is performed to a gear position at which the primary rotation speed is lower than the predicted primary rotation speed, and therefore a situation in which the primary rotation speed reaches the auto upshift rotation speed such that an upshift is performed immediately after the downshift, causing the driver to feel a sense of discomfort due to rapid changes in the gear position, can be prevented.

Further, when it is determined that the predicted primary rotation speed following a downshift is greater than the rotation speed limit value, a downshift is performed to a gear position at which the primary rotation speed is lower than the rotation speed limit value, and therefore the driver can be prevented from feeling a sense of discomfort due to rapid changes in the gear position.

Moreover, the rotation speed limit value is set to a rotation speed at which the time required for the primary rotation speed to reach the auto upshift rotation speed during acceleration is equal to or greater than the predetermined time, and therefore a certain amount of time is required for the primary rotation speed to reach the auto upshift rotation speed, at which an upshift is performed, following a downshift. As a result, the driver can be prevented from feeling a sense of discomfort due to unnecessarily rapid changes in the gear position.

Furthermore, a determination is made as to whether or not a kick down command has been output as a downshift request, and therefore a situation in which the primary rotation speed reaches the auto upshift rotation speed immediately after a kick down such that an upshift is performed, causing the driver to feel a sense of discomfort at the rapidly changing gear position, can be prevented.

Moreover, if it is determined that the primary rotation speed is equal to or greater than the rotation speed limit value when a kick down command is output, a downshift is prohibited and the gear position is held. Thus, a situation in which a kick down is performed when the primary rotation speed is in the vicinity of the auto upshift rotation speed such that an auto upshift is performed immediately thereafter, causing the driver to feel a sense of discomfort at the rapidly changing gear position, can be prevented.

Further, the rotation speed limit value is set such that the acceleration produced by a driving force step occurring during a kick down is smaller than the predetermined acceleration upper limit value. Hence, a situation in which the driver feels a sense of discomfort based on the driving force step in addition to the sense of discomfort caused by unnecessary changes in the gear position can be prevented.

Second Embodiment

In this embodiment, the constitution of the speed change control device for an automatic transmission is identical to that of the first embodiment, but the control content is different. Below, identical parts to those of the first embodiment have been allocated identical reference symbols, and description thereof has been omitted where appropriate.

Figure 5:
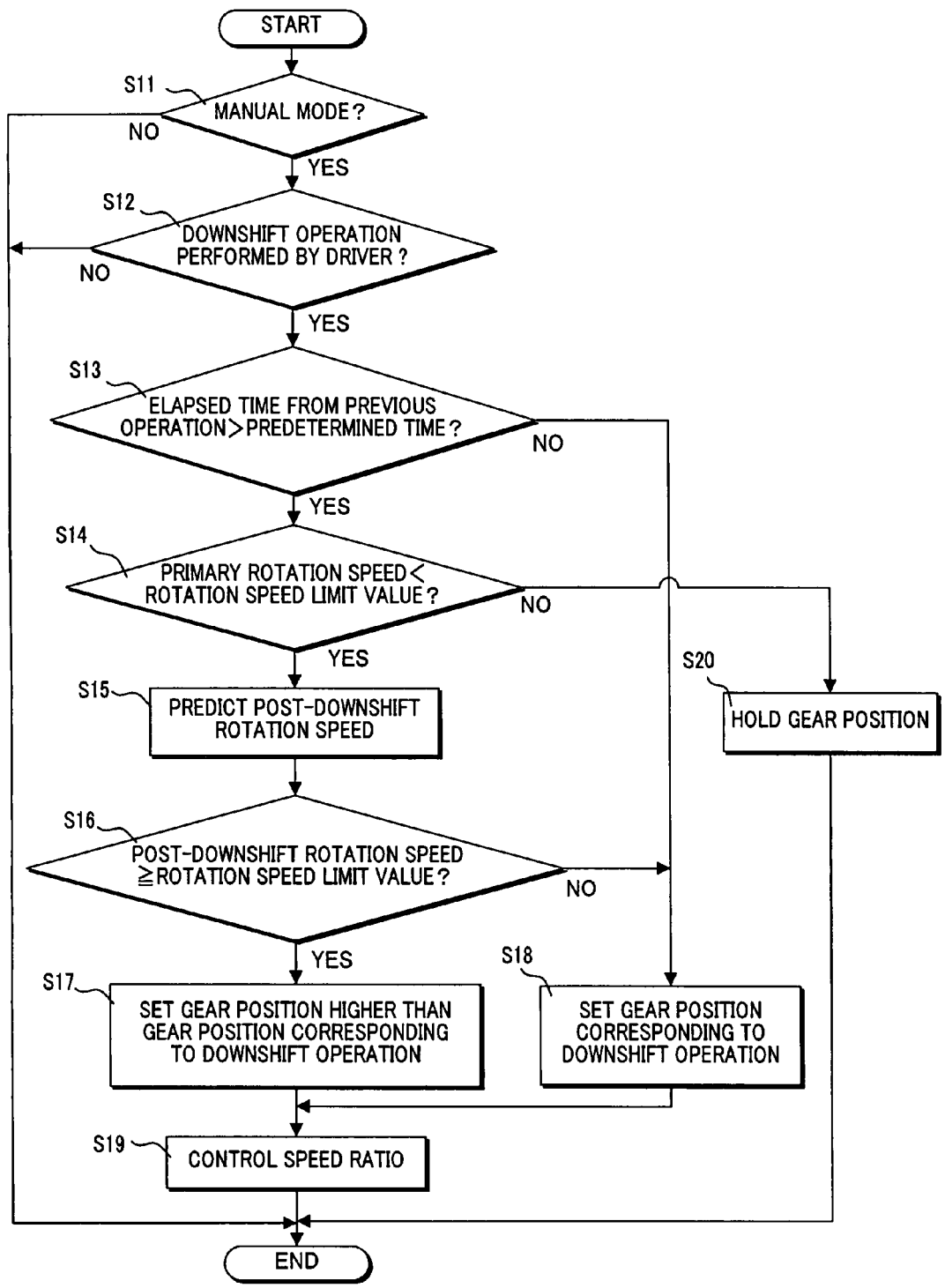
FIG. 5 is a flowchart showing control of the speed change control device for an automatic transmission according to a second embodiment.

Referring to the flowchart in FIG. 5, the control performed by the CVTCU 20 according to this embodiment will be described. FIG. 5 is a flowchart showing the control of the speed change control device for an automatic transmission according to this embodiment. This control is performed repeatedly at brief intervals (of 10 ms, for example).

In a step S11, a determination is made as to whether or not the speed change mode is set to the manual mode. When it is determined that the manual mode has been set, the routine advances to a step S12, and when it is determined that the manual mode has not been set, the processing is terminated.

In the step S12 (downshift request determining means), a determination is made as to whether or not a downshift operation has been performed by the driver. When it is determined that a downshift operation has been performed by the driver, the routine advances to a step S13, and when it is determined that a downshift operation has not been performed, the processing is terminated. A downshift operation performed by the driver is an operation performed by the driver to downshift the gear position.

In the step S13, a determination is made as to whether or not the elapsed time from the previous downshift operation performed by the driver is greater than a predetermined time (second predetermined time). If so, the routine advances to a step S14, and if not, the routine advances to a step S18.

The predetermined time is a maximum value of the elapsed time to the next downshift operation when a downshift is not performed following a downshift operation performed by the driver, and is determined in advance through experiment or the like. Hence, a shift operation performed within the predetermined time is determined to be a downshift operation performed for a second time when the driver senses that the desired gear position has not been achieved by an initial shift operation, and a shift operation performed after the predetermined time is determined to be a new downshift operation separate to the initial shift operation.

In the step S14, a determination is made as to whether or not the primary rotation speed is lower than a rotation speed limit value (second rotation speed limit value). When it is determined that the primary rotation speed is lower than the rotation speed limit value, the routine advances to a step 515, and when it is determined that the primary rotation speed is equal to or greater than the rotation speed limit value, the routine advances to a step S20.

Here, the rotation speed limit value is set such that acceleration produced by a driving force step occurring during a downshift performed as a result of a downshift operation is smaller than a predetermined acceleration upper limit value. The predetermined acceleration upper limit value is determined in advance through experiment or the like to a value at which the driving force step does not cause the driver to feel a sense of discomfort.

The rotation speed limit value used in this embodiment is set higher than the rotation speed limit value of the first embodiment. This is done so that during a downshift resulting from a driver operation, drivability is improved by prioritizing the driver operation as much as possible.

In the step S15 (rotation speed determining means), the engine rotation speed following the downshift is predicted.

In a step S16 (rotation speed determining means), a determination is made as to whether or not the post-downshift primary rotation speed predicted in the step S15 is equal to or greater than the rotation speed limit value. When the post-downshift primary rotation speed is equal to or greater than the rotation speed limit value, the routine advances to a step S17, and when the post-downshift primary rotation speed is smaller than the rotation speed limit value, the routine advances to a step S18.

In the step S17 (downshift control means), the lowest gear position among the gear positions at which the primary rotation speed falls below the rotation speed limit value, rather than the gear position indicated by the driver, is set as a target gear position. As a result, a gear position higher than the gear position corresponding to the downshift operation performed by the driver is set as the target gear position.

Meanwhile, when it is determined in the step S13 that the elapsed time following the previous downshift operation by the driver is equal to or smaller than the predetermined time, or when it is determined in the step S16 that the post-downshift primary rotation speed is equal to or smaller than the rotation speed limit value, the routine advances to the step S18, where the gear position based on the downshift operation is set.

In a step S19, the speed ratio of the transmission is controlled on the basis of the gear position set in the step S17 or the step S18.

Meanwhile, when it is determined in the step S14 that the primary rotation speed is equal to or greater than the rotation speed limit value, the routine advances to a step S20, where the gear position is held.

Next, referring to the map in FIG. 4, the actions of this embodiment will be described. In the manual mode, when a downshift operation instructing a downshift to the second speed is performed by the driver at the driving point A during traveling in the fourth speed, the predicted post-downshift primary rotation speed at the driving point B is equal to or greater than the rotation speed limit value, and therefore a downshift is performed to the third speed, which is the lowest gear position among the gear positions at which the primary rotation speed falls below the rotation speed limit value, such that the driving point shifts to the driving point E.

At this time, when another downshift operation is performed by the driver within the predetermined time from the previous downshift operation, the rotation speed limit value is ignored and a downshift is performed to the second speed, as shown by the dotted line arrow in FIG. 4, such that the driving point shifts to the driving point B.

When a downshift operation is performed by the driver during acceleration at the driving point B, the primary rotation speed is equal to or greater than the rotation speed limit value, and therefore the gear position is not switched and the current gear position is held.

At this time, when another downshift operation is performed by the driver within the predetermined time from the previous downshift operation, the rotation speed limit value is ignored and a downshift is performed to a first speed such that the driving point shifts to a driving point F.

In the embodiment described above, a determination is made as to whether or not a downshift operation has been performed by the driver as a downshift request, and hence, in addition to the effects of the first embodiment, a situation in which the primary rotation speed reaches the auto upshift rotation speed such that an upshift is performed immediately after a downshift performed in accordance with a driver operation, causing the driver to feel a sense of discomfort due to rapid changes in the gear position, can be prevented.

Moreover, when it is determined that the primary rotation speed is equal to or greater than the rotation speed limit value following a downshift operation performed by the driver, a downshift is prohibited and the gear position is held. Thus, a situation in which the driver performs a downshift operation when the primary rotation speed is in the vicinity of the auto upshift rotation speed such that an auto upshift is performed immediately thereafter, causing the driver to feel a sense of discomfort due to rapid changes in the gear position, can be prevented.

Further, the rotation speed limit value is set such that the acceleration produced by a driving force step occurring as a result of a downshift operation performed by the driver is smaller than the predetermined acceleration upper limit value. Hence, a situation in which the driver feels a sense of discomfort based on the driving force step in addition to the sense of discomfort caused by unnecessary changes in the gear position can be prevented.

This invention is not limited to the embodiments described above, and may be subjected to various alterations and modifications within the technical scope thereof.

For example, in the first embodiment, a determination is made as to whether or not a kick down request has been output during traveling in the manual speed change mode, whereas in the second embodiment, a determination is made as to whether or not a downshift request has been output in accordance with a driver operation. However, both determinations may be made at the same time.

In so doing, it is possible to avoid both a situation in which the primary rotation speed reaches the auto upshift rotation speed such that an upshift is performed immediately after a kick down, and a situation in which the primary rotation speed reaches the auto upshift rotation speed such that an upshift is performed immediately after a downshift performed as a result of a driver operation, and hence the driver can be prevented from feeling a sense of discomfort due to rapid changes in the gear position.

This application claims priority from Japanese Patent Application 2006-90318, filed Mar. 29, 2006, which is incorporated herein by reference in its entirety.

What is claimed is:

1. A speed change control device for an automatic transmission, including a manual speed change mode in which switching between a plurality of gear positions is performed in accordance with a driver operation, the device comprising:
a controller which
upshifts a gear position when a rotation speed of an input shaft of the transmission exceeds a predetermined high rotation speed;
determines a request to downshift the gear position of the transmission exists during traveling in the manual speed change mode;
calculates the input shaft rotation speed of the transmission following a downshift based on the downshift request;
determines the calculated rotation speed is higher than a rotation speed limit value set on a lower rotation side than the predetermined high rotation speed; and
performs a downshift to a gear position at which the input shaft rotation speed of the transmission is lower than the calculated rotation speed when it is determined that the calculated rotation speed is higher than the rotation speed limit value,
wherein the controller performs a downshift to a gear position at which the input shaft rotation speed of the transmission is lower than the rotation speed limit value when it is determined that the calculated rotation speed is higher than the rotation speed limit value.

2. The speed change control device as defined in claim 1, wherein the rotation speed limit value is set such that a time required for the input shaft rotation speed of the transmission to exceed the predetermined high rotation speed after exceeding the rotation speed limit value following a downshift based on the downshift request is equal to or greater than a first predetermined time.

3. The speed change control device as defined in claim 1, wherein, when it is determined that a request to downshift the gear position of the transmission exists during traveling in the manual speed change mode and the input shaft rotation speed of the transmission is higher than the rotation speed limit value, the controller prohibits downshifting regardless of the calculated rotation speed being higher than the rotation speed limit value.

4. The speed change control device as defined in claim 1, wherein the rotation speed limit value is set such that an acceleration produced by a driving force step occurring when a downshift is performed on the basis of the downshift request is smaller than a predetermined acceleration upper limit value.

5. The speed change control device as defined in claim 1, wherein the controller determines at least one of a request to perform a kick down exists during traveling in the manual speed change mode and a request to perform a downshift in accordance with a driver operation exists during traveling in the manual speed change mode.

6. The speed change control device as defined in claim 5, wherein, when it is determined that a request to perform a downshift in accordance with a driver operation exists and an elapsed time following a previous driver operation is shorter than a second predetermined time, the controller performs a downshift based on the downshift request regardless of the calculated rotation speed being higher than the rotation speed limit value.

7. The speed change control device for as defined in claim 1, wherein the controller
determines a request to perform a kick down exists during traveling in the manual speed change mode and a request to perform a downshift in accordance with a driver operation exists during traveling in the manual speed change mode, and
determines the calculated rotation speed is higher than a first rotation speed limit value when a kick down is performed during traveling in the manual speed change mode and the calculated rotation speed is higher than a second rotation speed limit value when a downshift is performed on the basis of a downshift request in accordance with a driver operation during traveling in the manual speed change mode, the second rotation speed limit value being higher than the first rotation speed limit value.

8. The speed change control device as defined in claim 5, wherein, when it is determined that a request to perform a downshift in accordance with a driver operation exists and an elapsed time following a previous driver operation is shorter than a second predetermined time, the controller performs a downshift based on the downshift request regardless of the calculated rotation speed being higher than the rotation speed limit value.

9. A speed change control method for an automatic transmission, including a manual speed change mode in which switching between a plurality of gear positions is performed in accordance with a driver operation, the method comprising:
upshifting a gear position when a rotation speed of an input shaft of the transmission exceeds a predetermined high rotation speed;
determining a request to downshift the gear position of the transmission exists during traveling in the manual speed change mode;
calculating the input shaft rotation speed of the transmission following a downshift based on the downshift request;
determining the calculated rotation speed is higher than a rotation speed limit value set on a lower rotation side than the predetermined high rotation speed; and
performing a downshift to a gear position at which the input shaft rotation speed of the transmission is lower than the calculated rotation speed when it is determined that the calculated rotation speed is higher than the rotation speed limit value,
wherein the performing a downshift performs a downshift to a gear position at which the input shaft rotation speed of the transmission is lower than the rotation speed limit value when it is determined that the calculated rotation speed is higher than the rotation speed limit value.

10. The speed change control method as defined in claim 9, wherein the rotation speed limit value is set such that a time required for the input shaft rotation speed of the transmission to exceed the predetermined high rotation speed after exceeding the rotation speed limit value following a downshift based on the downshift request is equal to or greater than a first predetermined time.

11. The speed change control method as defined in claim 9, wherein, when it is determined that a request to downshift the gear position of the transmission exists during traveling in the manual speed change mode and the input shaft rotation speed of the transmission is higher than the rotation speed limit value, the performing a downshift prohibits downshifting regardless of the determination result of the step of determining the calculated rotation speed is higher than the rotation speed limit value.

12. The speed change control method as defined in claim 9, wherein the rotation speed limit value is set such that an acceleration produced by a driving force step occurring when a downshift is performed on the basis of the downshift request is smaller than a predetermined acceleration upper limit value.

13. The speed change control method as defined in claim 9, wherein the step of determining the request to downshift the gear position of the transmission exists determines at least one of a request to perform a kick down exists during traveling in the manual speed change mode and a request to perform a downshift in accordance with a driver operation exists during traveling in the manual speed change mode.

14. The speed change control method as defined in claim 13, wherein, when it is determined that a request to perform a downshift in accordance with a driver operation exists and an elapsed time following a previous driver operation is shorter than a second predetermined time, the performing a downshift performs a downshift based on the downshift request regardless of the determination result of the step of determining the calculated rotation speed is higher than the rotation speed limit value.

15. The speed change control method as defined in claim 9, wherein
    the step of determining the request to downshift the gear position of the transmission exists determines a request to perform a kick down exists during traveling in the manual speed change mode and a request to perform a downshift in accordance with a driver operation exists during traveling in the manual speed change mode, and
    the step of determining the calculated rotation speed is higher than the rotation speed limit value determines the calculated rotation speed is higher than a first rotation speed limit value when a kick down is performed during traveling in the manual speed change mode, and determines the calculated rotation speed is higher than a second rotation speed limit value when a downshift is performed on the basis of a downshift request in accordance with a driver operation during traveling in the manual speed change mode, the second rotation speed limit value being higher than the first rotation speed limit value.

16. The speed change control method as defined in claim 15, wherein, when it is determined that a request to perform a downshift in accordance with a driver operation exists and an elapsed time following a previous driver operation is shorter than a second predetermined time, the performing a downshift performs a downshift based on the downshift request regardless of the determination result of the step of determining the calculated rotation speed is higher than the rotation speed limit value.

17. A speed change control device for an automatic transmission, including a manual speed change mode in which switching between a plurality of gear positions is performed in accordance with a driver operation, the device comprising:
    auto upshift means for upshifting a gear position when a rotation speed of an input shaft of the transmission exceeds a predetermined high rotation speed;
    downshift request determining means for determining a request to downshift the gear position of the transmission exists during traveling in the manual speed change mode;
    rotation speed determining means for calculating the input shaft rotation speed of the transmission following a downshift based on the downshift request, and determining the calculated rotation speed is higher than a rotation speed limit value set on a lower rotation side than the predetermined high rotation speed; and
    downshift control means for performing a downshift to a gear position at which the input shaft rotation speed of the transmission is lower than the calculated rotation speed when it is determined that the calculated rotation speed is higher than the rotation speed limit value;
    wherein the downshift control means is for performing a downshift to a gear position at which the input shaft rotation speed of the transmission is lower than the rotation speed limit value when it is determined that the calculated rotation speed is higher than the rotation speed limit value.

* * * * *